United States Patent
Roger et al.

(10) Patent No.: US 9,575,489 B2
(45) Date of Patent: Feb. 21, 2017

(54) METHOD OF ERROR DETECTION OF AN AIRCRAFT FLIGHT MANAGEMENT AND GUIDANCE SYSTEM AND HIGH-INTEGRITY FLIGHT MANAGEMENT AND GUIDANCE SYSTEM

(71) Applicant: THALES, COURBEVOIE (FR)

(72) Inventors: Michel Roger, Blagnac (FR); Alexandre Darbois, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/951,420

(22) Filed: Nov. 24, 2015

(65) Prior Publication Data

US 2016/0147224 A1    May 26, 2016

(30) Foreign Application Priority Data

Nov. 26, 2014    (FR) ...................................... 14 02675

(51) Int. Cl.
*G05D 1/00*    (2006.01)
*G08G 5/00*    (2006.01)

(52) U.S. Cl.
CPC ............ *G05D 1/0077* (2013.01); *G08G 5/003* (2013.01); *G08G 5/0047* (2013.01)

(58) Field of Classification Search
CPC ..... G05D 1/0077; G08G 5/003; G08G 5/0047
See application file for complete search history.

(56) References Cited

U.S. PATENT DOCUMENTS

| 8,660,745 B2 | 2/2014 | Risse et al. |
| 2012/0092193 A1 | 4/2012 | Perrie et al. |
| 2012/0150368 A1* | 6/2012 | Potagnik ............... G06F 11/184 701/14 |
| 2012/0173052 A1 | 7/2012 | Nicolas et al. |
| 2015/0073691 A1* | 3/2015 | Mere ...................... G05D 1/101 701/120 |

FOREIGN PATENT DOCUMENTS

| EP | 1 679 567 A2 | 7/2006 |
| EP | 2 685 218 A2 | 1/2014 |
| EP | 2 793 096 A2 | 10/2014 |
| FR | 2 970 093 A1 | 7/2012 |
| FR | 2 983 598 A1 | 6/2013 |

* cited by examiner

*Primary Examiner* — Rodney Butler
(74) *Attorney, Agent, or Firm* — Baker & Hostetler LLP

(57) ABSTRACT

A method of error detection of a flight management system coupled with a guidance of an aircraft according to a flight plan, comprises the steps of: generating a first reference guidance order, monitoring the integrity of the first reference position, when the first reference position is not monitored as being dependable: invalidating the first FMS assembly and the associated guidance system, when the first reference position and the first reference trajectory are monitored as being dependable: generating a first monitoring guidance order, generating a first reference flight control, generating a first monitoring flight control, in monitoring the integrity of the first reference guidance order when the first reference guidance order is not monitored as being dependable: invalidating the first FMS assembly and the associated guidance.

22 Claims, 14 Drawing Sheets

METHOD OF ERROR DETECTION OF AN AIRCRAFT FLIGHT MANAGEMENT AND GUIDANCE SYSTEM AND HIGH-INTEGRITY FLIGHT MANAGEMENT AND GUIDANCE SYSTEM

CROSS-REFERENCE TO RELATED APPLICATION

This application claims priority to foreign French patent application No. FR 1402675, filed on Nov. 26, 2014, the disclosure of which is incorporated by reference in its entirety.

FIELD OF THE INVENTION

The present invention relates generally to the detection of error of an aircraft flight management and guidance system. More particularly the invention relates to error detection making it possible to obtain a flight management and guidance system exhibiting high integrity.

BACKGROUND

A flight plan is the detailed description of the route to be followed by an aircraft within the framework of a planned flight. The flight plan is customarily managed aboard civil aeroplanes by a system designated by the terminology of "Flight Management System", which will subsequently be called the FMS, which places the route to be followed at the disposal of the flight personnel and at the disposal of the other onboard systems. This FMS system also allows an aid to navigation, through the display of information useful to the pilots, or else through the communication of guidance orders to an automatic piloting system.

FIG. 1 presents a summary diagram illustrating the structure of an FMSO known from the prior art. A known FMS type system has a man-machine interface MMI comprising for example a keyboard and a display screen, or else simply a touch display screen, as well as at least the following functions, illustrated in a generic manner by an associated module and described in the ARINC 702 standard:

Navigation LOC performs the optimal location of the aircraft as a function of the geo-location means GEO-LOC such as satellite or GPS based geo-positioning, VHF radionavigation beacons, inertial platforms. This module communicates with the aforementioned geo-location devices. Thus the module LOC calculates the position (latitude, longitude, altitude) and the speed of the aircraft in space.

Flight plan FPLN inputs the geographical elements constituting the skeleton of the route to be followed, such as the points imposed by the departure and arrival procedures, the waypoints, the aerial routes or "airways";

Navigation database NAVDB contains the waypoints, the geographical routes, the procedures and the beacons;

Performance database PERFDB contains the craft's aerodynamic performance and engine parameters;

Lateral trajectory TRAJ, constructs by calculation a continuous trajectory on the basis of the points of the flight plan, using the performance of the aircraft and while complying with the confinement constraints (RNP);

Predictions PRED, constructs an optimized vertical profile on the lateral trajectory and provides the predictions in terms of transit time, quantity of fuel remaining, altitude and speed of transit at each of the points of the flight plan;

Guidance GUID establishes, on the basis of the position and of the calculated trajectory, guidance orders to guide the aircraft in the lateral, vertical planes and speed so as to follow its three-dimensional trajectory, while optimizing its speed. The guidance orders are transmitted to the automatic pilot. When the aircraft is equipped with an automatic pilot PA and it is operating, it is the latter which transforms the guidance orders into flight controls;

DATALINK digital data link communicates with the air traffic control centres, the ground operational centres and, in the future, other aircraft 13.

The flight plan is entered by the pilot, or else by data link, on the basis of data contained in the navigation database.

The pilot thereafter inputs the parameters of the aircraft: mass, flight plan, span of cruising levels, as well as one or a plurality of optimization criteria, such as the Cost Index CI. These inputs allow the modules TRAJ and PRED to calculate respectively the lateral trajectory and the vertical profile, that is to say the flight profile in terms of altitude and speed, which for example minimizes the optimization criterion.

Thus in a conventional manner a flight management system:

calculates a position of the aeroplane (LOC) on the basis of data arising from onboard sensors listed hereinabove, determines a trajectory (module TRAJ/PRED) with the databases PERF DB, in accordance with the flight plan defined on the basis of the NAV DB, provides, on the basis of the position and of the trajectory, guidance orders (module GUID), ("flight guidance target") so as to follow this trajectory. In a conventional manner, the calculated aeroplane position makes it possible to identify a possible disparity with the trajectory or a forthcoming change (turn, climb, acceleration, deceleration) of the trajectory. On the basis of this lateral disparity, GUID will establish a guidance order, in a conventional manner: roll laterally, pitch or slope vertically, speed or thrust level in terms of speed.

Hereinafter in the disclosure, the term "guidance order" (or "flight guidance target") covers all the guidance orders such as defined hereinabove.

The guidance orders generated by GUID are transmitted to the automatic pilot PA. The PA transforms the guidance orders which are dispatched to it into flight controls directly applied to the aircraft (Ailerons, Elevators, Engines etc.)

Hereinafter in the disclosure, the term "flight control" covers all the flight controls such as defined hereinabove.

In a conventional manner, the automatic pilot generates and dispatches to the control surfaces of the aeroplane the position (angle) for the ailerons and elevators, the thrust for the engines etc.

Generally, an automatic pilot PA makes it possible to guide an aircraft automatically on the basis of directives provided, either by the pilot ("tactical") through an interface termed FCU (AIRBUS) or MCP (BOEING), or by a system of FMS type (strategic). We shall be interested in guidance on the basis of the FMS.

These flight controls are presented to the pilot via the flight director in the form for example of vertical and lateral bars (that the pilot must try to follow by hand when the automatic pilot is not engaged).

Certain procedures require a more significant level of precision in aircraft guidance. For example, towards the end of the cruising phase and a few minutes before beginning the descent, the pilot selects via the FMS the approach procedure that he will use to place the aeroplane on the landing runway of his destination airport. The approach procedure for certain airports is of the RNP AR type with RNP<0.3 NM.

The RNP concept used in the aeronautical industry consists on the one hand in the capability of the aeroplane's navigation system to monitor its performance (precision) and to inform the pilot of compliance or otherwise with the operational requirements (error) during the operation, and on the other hand in the optimization of the approach procedures by basing them on the navigation performance of the aeroplane.

This concept makes it possible to reduce the spacings between aeroplanes when cruising and in the terminal zone, to optimize the takeoff and landing procedures. It also makes it possible to reduce the minima associated with the approach procedures both in non-precision approaches and in RNAV conventional approaches.

An RNP procedure refers to a specific procedure or block of space. For example, an RNP xx procedure signifies that the aircraft's navigation systems must be capable of calculating the position of the aircraft in a circle of xx Nm, for example an RNP 0.3 in a circle of 0.3 Nm.

The RNP AR concept for its part makes it possible to add several capabilities:

access without specific ground means to fields that are difficult to access because of the relief (for example Juneau, Queenstown)

reconcile the trajectories of procedures of parallel approach on airports (gain 1 RNP between two procedures (for example San Francisco)

construct shorter procedures which therefore consume less fuel (for example Doha)

construct procedures which reduce sound nuisance (for example Washington, arrival over the Potomac)

reduce the dispersion of the approach trajectories (vs ATC)

replace approaches requiring ground means by virtue of a reduction in the lateral uncertainty and a monitoring of the vertical disparity with the reference profile (the FAA has twinned CAT I approaches with RNP procedures, often AR).

The notion AR ("Authorization required"), involves an obligation to obtain, on a case by case basis, authorization by the local authorities to operate the approach in question with the defined minima. This authorization is delivered to each crew on a given aeroplane type and for each approach.

For these specific approaches, such as RNP AR approaches, it is appropriate to implement an avionics architecture which makes it possible to comply in an automatic manner with the integrity and continuity constraints associated with this type of approach.

Continuity, or availability, is intended to mean the fact that when a fault with the FMS system or with the associated guidance system (automatic pilot) is detected, the aircraft is capable of switching over to another system affording the same level of service. Conventionally, availability is obtained by splitting the FMS and the associated automatic pilot, such as illustrated in FIG. 2. The two chains $FMS1_0/PA1_0$ and $FMS2_0/PA2_0$ are autonomous, that is to say independent of one another. The $FMS1_0$ calculates a position, a trajectory and the module $GUID1_0$ generates a guidance order $CG1_0$ such as described previously. The guidance order $CG1$ is dispatched to the automatic pilot $PA1_0$. Likewise the $FMS2_0$ calculates a position, a trajectory and a module $GUID2_0$ generates a guidance order $CG2_0$ such as described previously. The guidance order $CG1_0$ is dispatched to the automatic pilot $PA1_0$ and the guidance order $CG2_0$ is dispatched to the automatic pilot $PA2_0$.

When a fault is detected in the system $FMS1_0+PA1_0$, the overall system switches over to the system $FMS2_0+PA2_0$, either automatically, or through an action of the pilot.

In order to carry out approaches of "autoland" type in which the automatic pilot is capable of landing the aeroplane, certain automatic pilots exhibit a so-called COM/MON architecture. The COM (for "command") part of the automatic pilot establishes a directive $CV1_0$ with the aid of the piloting laws.

In a conventional manner, the automatic pilot determines the disparity between the current attitude (roll, pitch) of the aeroplane and the desired directive (pilot selection or FM guidance command) and generates on the basis of a piloting law a flight control $CV1_0$. Moreover, the COM part of the automatic pilot transmits the desired directive to the MON (for "monitoring") part, which implements in the same manner as COM the same piloting law to generate a flight control CV1 bis. The integrity of the flight control $CV1_0$ is verified by comparison with CV1 bis. The COM part of the automatic pilot PA has transmitted its command $CV1_0$ to the MON part of the PA and the MON part of the PA has transmitted its command CV1 bis to the COM part of the PA. PA COM and MON compare their respective commands and invalidate the PA if a representative disparity is measured.

Each automatic pilot uses a unique guidance order arising from the corresponding FMS.

Concerning the problematic issue of the integrity of the system for these specific approaches, for example to be able to follow an RNP xx procedure, the aircraft's navigation system must be capable of calculating the position of the aircraft in a circle of xx Nm, but the automatic piloting system must also guarantee that it will be able to guide the aircraft with the same precision.

The precision level of the guidance is fixed and known, whereas the precision of the calculation of the position can vary along the flight (different GPS coverage, drifts of the inertial platforms, more or less dense coverage of the radio navigation means).

In a conventional manner, the error in calculating the aeroplane position called TSE (Total System Error) represented in FIG. 3 is the quadratic sum of 3 components:

The aeroplane location error or PEE for "Position Estimation Error",

The aeroplane trajectory error or PDE for "Path Definition Error",

The aeroplane guidance error or PSE for "Path steering Error".

The arrow DesP corresponds to the desired trajectory ("desired path"), the dotted arrow DefP ("defined path") corresponds to the calculated trajectory.

The flight management system FMS contributes to the three components of the TSE, as illustrated in FIG. 4.

The term "outer loop" (or "large loop") corresponds to the servocontrol laws managing the displacement of the centre of gravity of the aeroplane (high-level directive as input such as heading, altitude, etc. and low-level directive as output roll, pitch). The term "inner loop" (or "small loop") designates the servocontrol laws managing the equilibrium of the aeroplane around the centre of gravity (low-level directive such as roll, pitch as input, flight controls as outputs such as the angles in regard to the control surfaces). PFD signifies Primary Flight Display, where the Flight Director directives are displayed.

Now, it is the components (Position, Trajectory and guidance) of this TSE which are one of the sources of error leading to a potentially undetected erroneous calculation of a lateral or vertical guidance.

The demand for more significant integrity of the TSE appears for so-called RNP AR approaches with RNP<0.3 NM. To aid compliance with this integrity, a strong constraint has appeared in regard to the definition of the trajectory which must be "geo" referenced laterally and vertically, stated otherwise the straight and curved segments for the lateral and the slopes for the vertical are fixed with respect to the ground and all the aeroplanes will follow exactly the same trajectory. It emerges therefrom that for FMSs using a good representation of the "earth" (WGS84 compatible), the error related to the construction of the trajectory can be ignored in the formula for the TSE.

It is therefore appropriate for the FMS system to ensure the required integrity by detecting the calculation errors in regard to position and to guidance. The current facilities supporting the FMS application do not guarantee an occurrence per flight hour of non-detection of erroneous calculation of less than a few 10–6, typically $5.10^{-6}$.

Now, for approaches of RNP type with RNP<0.3 NM for example, an integrity level called "hazardous", corresponding to a fault occurrence of less than $10^{-7}$ per flight hour, is required. A lone FMS may not therefore ensure an integrity of this level. Duplication of the FMS used for obtaining continuity does not solve this problem, each FMS being individually limited in integrity.

A first solution of the prior art to attain the "hazardous" level of integrity is described in document U.S. Pat. No. 8,660,745. The architecture of the system comprises two FMSs, a "master" FMS carrying out the "computing" and a second "slave" FMS carrying out the "monitoring". The commands emitted by the master are verified by the slave: If the slave FMS estimates not being in the conditions (sequencing of the point of the flight plan aimed at to pass to the following point), it rejects the guidance order causing the transition to independent. The 2 FMSs are no longer in DUAL mode and operate without exchanging information. Thus the crew knows that the RNP manoeuvre poses a problem, but the difficulty is to know which FMS is valid and which FMS is defective. This architecture makes it possible to maintain the proper level of integrity since the guidance error is detected but does not comply with the continuity requirement since the pilot cannot continue the operation, since even if he succeeds in detecting the "good" FMS, the integrity level required is not achieved with a lone FM.

A second solution of the prior art to attain the "hazardous" level of integrity is described in document US20120092193 and in FIG. 5. This architecture called "Triplex" implements 3 FMSs and two automatic pilots. The principle is that each of the three FMSs, FMS1, FMS2 and FMS3, is capable of generating a guidance order independently.

On the basis of these three guidance order values, a vote is carried out in the first automatic pilot PA1, that is to say that a middle value is calculated, and if a value is too far from the middle value, then it is discarded and the corresponding FMS is invalidated. When an FMS is discarded, there still remain two FMSs which can be compared, guaranteeing the availability and the integrity level required. Thus this architecture makes it possible, in case of a fault with a first FMS, to continue to guide the aeroplane (availability) along the trajectory with the same integrity level ("hazardous"), during approach procedure of RNP xx type.

A drawback of this architecture is that it is expensive to develop, since the vote is complex to fine tune and requires a significant modification of the automatic pilot. Moreover, a great deal of aircraft are equipped only with 2 FMSs and do not have the capability to add a $3^{rd}$ instance at the very least at lesser cost. On the other hand they may wish to access airports with approaches of RNP AR type with RNP<0.3 NM.

An aim of the invention is to alleviate the aforementioned drawbacks, by proposing an avionics architecture (and a method) which is simplified, compatible with a system with 2 FMSs and capable of guiding an aircraft automatically while guaranteeing a high integrity level, and if appropriate while also guaranteeing continuity.

SUMMARY OF THE INVENTION

The subject of the present invention is a method of error detection of a flight management system coupled with a guidance of an aircraft according to a flight plan, comprising the steps consisting in:

generating a first reference guidance order calculated by a part of a first FMS assembly called the calculation part of the first FMS assembly on the basis of a first reference position and of a first reference trajectory which are calculated by the calculation part of the first FMS assembly on the basis of data arising from onboard sensors, from a first navigation database and from a first performance database, monitoring the integrity, by a part of the first FMS assembly called the monitoring part of the first FMS assembly, of the first reference position, on the basis of at least part of the said data arising from onboard sensors, when the first reference position is not monitored as being dependable:

Invalidating the first FMS assembly and the associated guidance system, when the first reference position is monitored as being dependable:

generating a first monitoring guidance order calculated by the monitoring part of the first FMS assembly, on the basis of the first reference position and of the first reference trajectory, generating a first reference flight control, by a reference part of a first automatic pilot, on the basis of the first reference guidance order, generating a first monitoring flight control, by a monitoring part of the first automatic pilot, on the basis of the first monitoring guidance order, monitoring the integrity of the first reference guidance order with the aid of the first monitoring guidance order, when the first reference guidance order is not monitored as being dependable:

invalidating the first FMS assembly and the associated guidance, when the first reference guidance order is monitored as being dependable:

delivering the first directive of dependable reference guidance.

Advantageously the method furthermore comprises the step consisting in, when the first reference guidance order is monitored as being dependable:

verifying the consistency of the first reference flight and monitoring commands, when the first reference flight and monitoring commands are inconsistent:

invalidating the first automatic pilot, when the first reference flight and monitoring commands are consistent:

delivering the first consistent reference flight control.

BRIEF DESCRIPTION OF THE DRAWINGS

Other characteristics, aims and advantages of the present invention will become apparent on reading the detailed description which will follow and with regard to the appended drawings given by way of nonlimiting examples and in which.

DETAILED DESCRIPTION OF THE INVENTION

Figure 1:
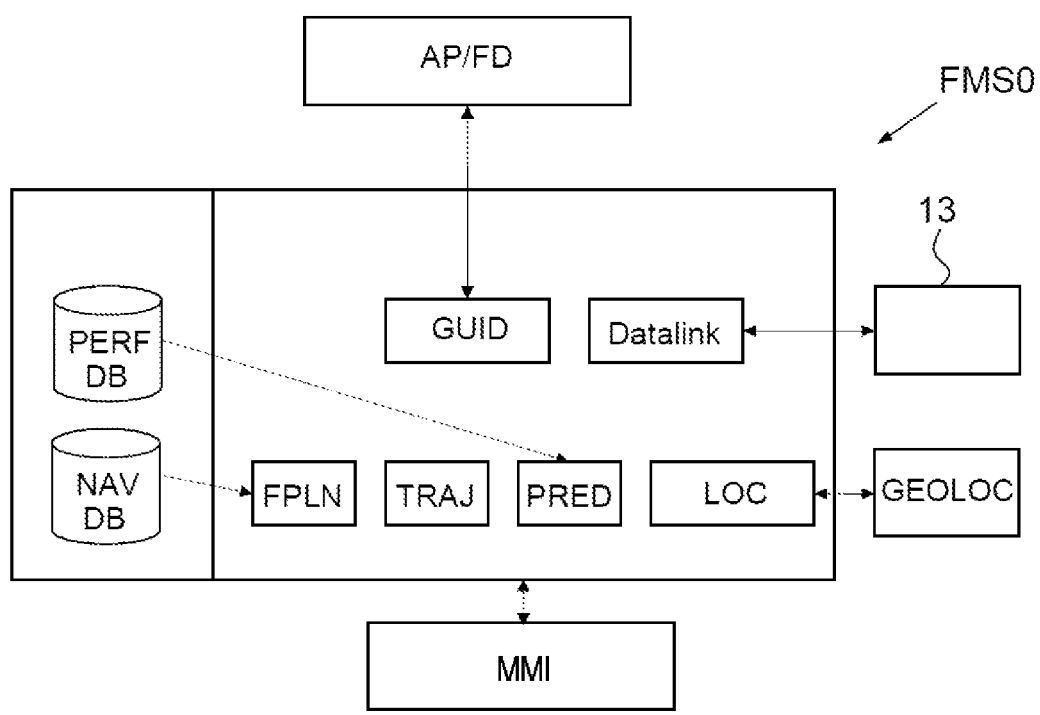
FIG. 1 already cited presents a summary diagram illustrating the structure of an FMS known from the prior art, FIG. 2 already cited illustrates an architecture of the prior art ensuring the integrity of the guidance of the aircraft, FIG. 3 already cited illustrates the three components of the error in calculating the aeroplane position (TSE), FIG. 4 already cited illustrates the contribution of a flight management system to the three components of the error in calculating the aeroplane position (TSE), FIG. 5 already cited illustrates an architecture of the prior art compatible with an RNP xx approach, FIG. 6 describes a method of error detection of an aircraft flight management and guidance system according to the invention, FIG. 7 describes an embodiment of the method according to the invention, FIG. 8a describes the method according to the invention furthermore comprising steps duplicated on a second system executing the same method, FIG. 8b describes an embodiment of the method executed by the second system, FIG. 8c describes another embodiment of the method executed by the second system, FIG. 9 describes a system 10 for flight management and guidance of an aircraft according to the invention with high integrity, FIG. 10 describes a more detailed implementation of the system according to the invention.
Figure 2:
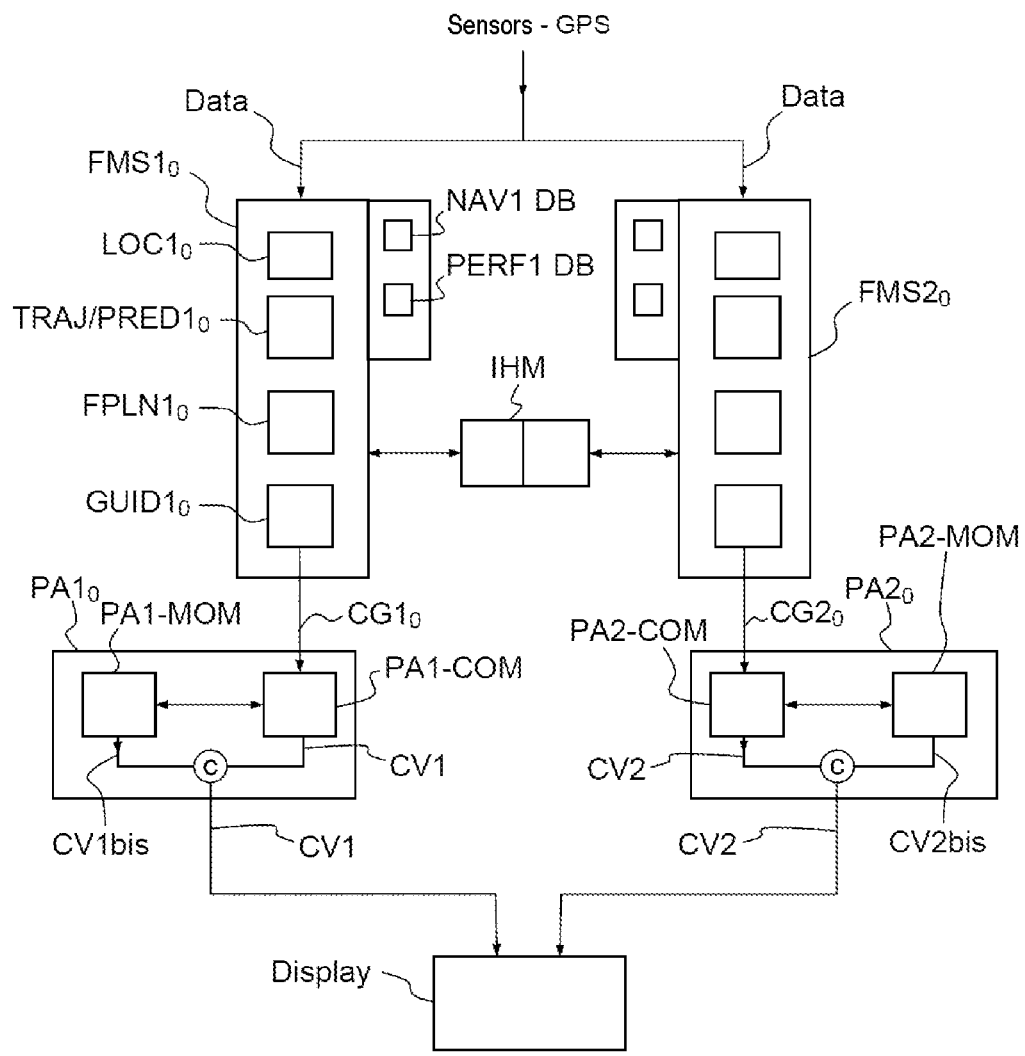
Figure 3:
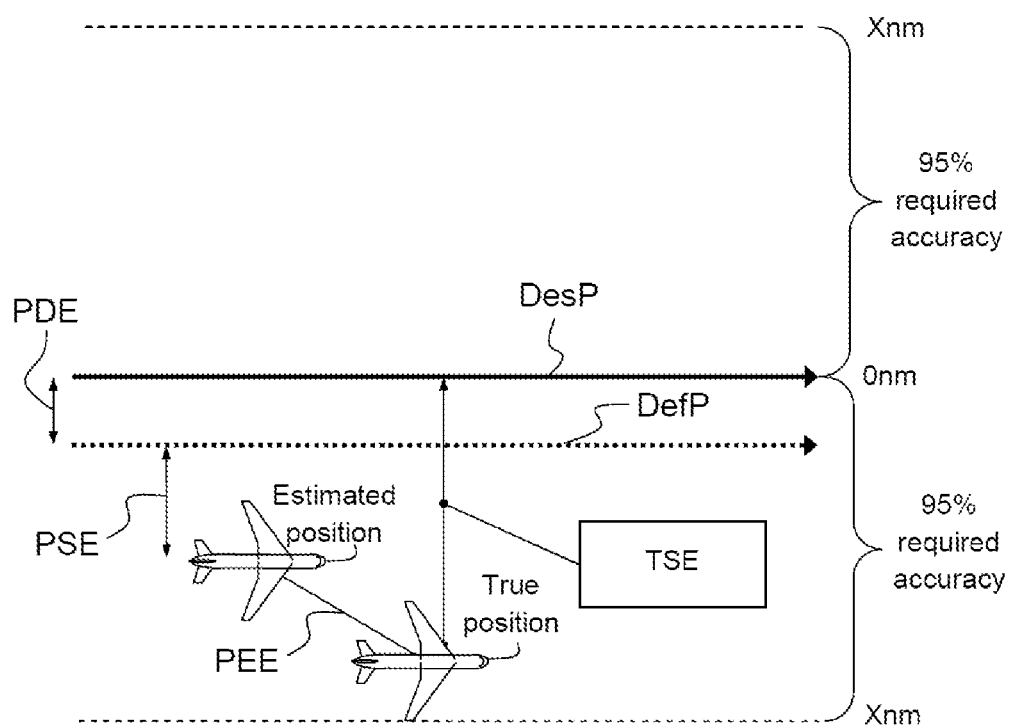
Figure 4:
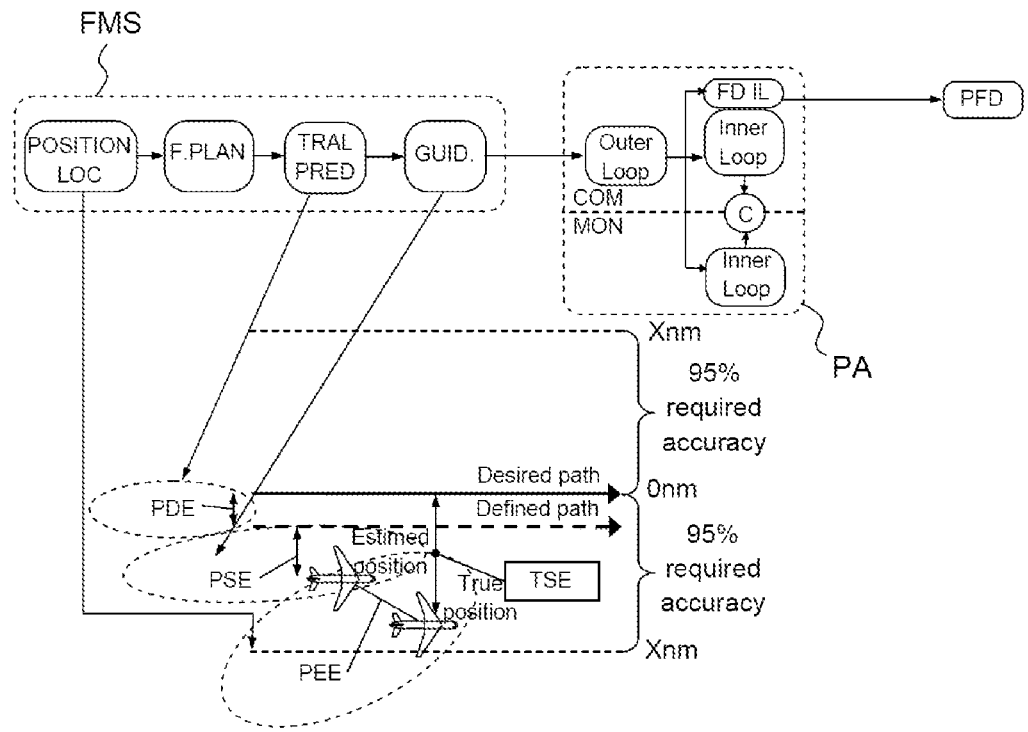
Figure 5:
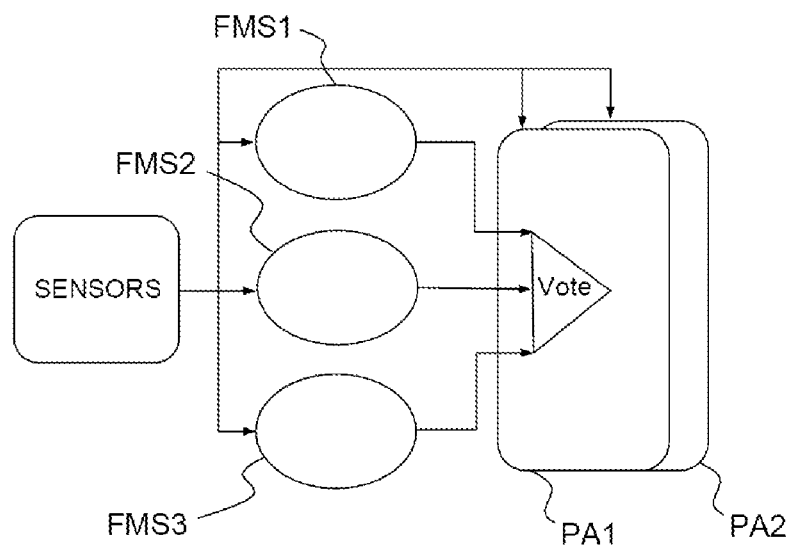
Figure 6:
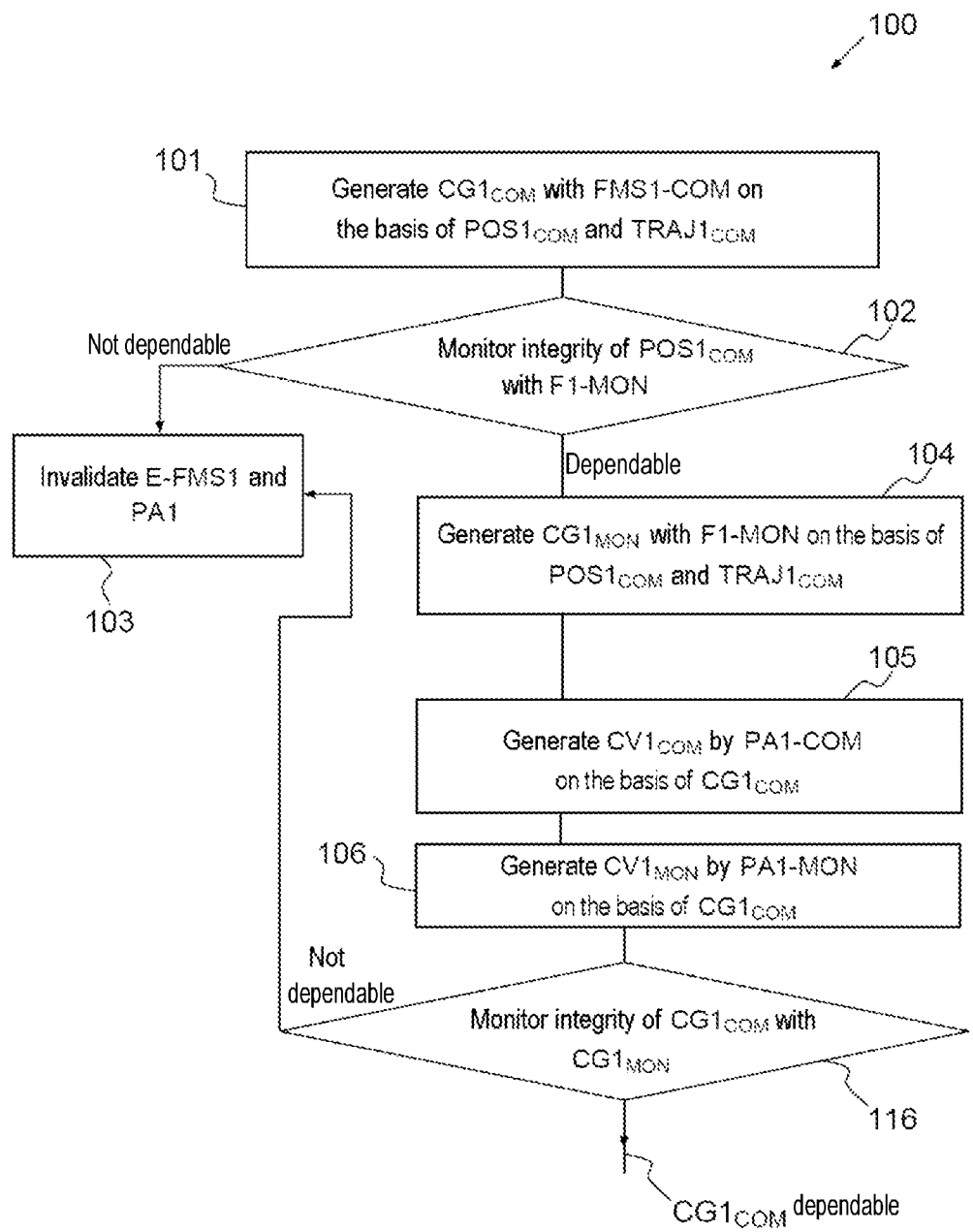

FIG. 6 describes a method 100 of error detection of a system for flight management and guidance of an aircraft in accordance with a flight plan PV according to the invention.

The method comprises a first step 101 consisting in generating a first reference guidance order $CG1_{COM}$ calculated in a conventional manner on the basis of a first reference position $POS1_{COM}$ and of a first reference trajectory $TRAJ1_{COM}$.

The first reference guidance order $CG1_{COM}$ is calculated by a part of a first FMS assembly called E-FMS1, the part being called the calculation part FMS1-COM of the first FMS assembly E-FMS1.

$POS1_{COM}$ and $TRAJ1_{COM}$ are calculated by FMS1-COM in a conventional manner on the basis of data DATA arising from onboard sensors such as GPS receivers, inertial platforms, signals arising from VHF radio beacons, from a first navigation database NAV1 DB and from a first performance database PERF1 DB.

$CG1_{COM}$ is calculated in a conventional manner, the function being ensured by a module $GUID1_{COM}$ of FMS1-COM.

The method 100 according to the invention thereafter comprises a step 102 of monitoring the integrity of the first reference position $POS1_{COM}$ on the basis of at least part of the said data arising from onboard sensors.

The monitoring is performed by a part of E-FMS1 called the monitoring part F1-MON, independent of the part F1-COM; stated otherwise carried by a calculation facility different from that of FMS1-COM.

Typically, the FMS1-MON receives the information arising from the position sensors (GPS, Inertias) and the position $POS1_{COM}$ which is transmitted to it by FMS1-MON. FMS1-MON performs a likelihood test by comparing the position $POS1_{COM}$ with the GPS positions, which for example gives three positions forming a triangle in which the aeroplane must be situated. If the disparity is too significant the position $POS1_{COM}$ is considered invalid. For example during a procedure RNM<0.3 mn, one looks to see whether $POS1_{COM}$ is not more than 0.1 nm away from the GPS position. The position is not recalculated completely by FMS1-MON; it is sought here to verify that the calculation carried out by FMS1-COM does not exhibit an anomaly.

Thus the monitoring of $POS1_{COM}$ makes it possible to detect an error of PEE type.

When the first reference position $POS1_{COM}$ is not monitored as being dependable, the method 100 comprises a step 103 consisting in invalidating the first FMS assembly E-FMS1 and the associated guidance system PA1. This invalidation consists in disengaging the assembly FMS1/PA1.

When the first reference position $POS1_{COM}$ is monitored as being dependable the method 100 generates in a step 104 a first monitoring guidance order $CG1_{MON}$ on the basis of the first monitored reference position $POS1_{COM}$ and of the first reference trajectory $TRAJ1_{COM}$ which has been dispatched to F1-MON by FMS1-COM, which stores it. The calculation of $CG1_{MON}$ is therefore performed by the monitoring part F1-MON.

The guidance order $CG1_{MON}$ is calculated on the basis of a position and of a trajectory which are identical to that of FMS1-COM. This calculation is performed by F1-MON, using the same guidance laws independently.

Therefore $CG1_{MON}$ is calculated independently of $CG1_{COM}$, and this will make it possible to detect possible errors in the calculation of the guidance order used to guide the aircraft.

The method 100 also comprises a step 105 of generating a first reference flight control $CV1_{COM}$ on the basis of the first reference guidance order $CG1_{COM}$.

$CV1_{COM}$ is generated in a conventional manner by a reference part PA1-COM of a first automatic pilot PA1 coupled to the first FMS assembly E-FMS1. The automatic pilot PA1 exhibits a conventional COM/MON architecture, that is to say that it comprises a reference part PA1-COM and a monitoring part PA1-MON as described in the prior art.

Thus steps 101 and 105 are conventional steps carried out by the part FMS1-COM which fulfils the functions of a conventional FMS coupled to the COM part of the automatic pilot PA1.

A step 106 generates a first monitoring flight control $CV1_{MON}$ on the basis of the first reference guidance order $CG1_{COM}$, which is dispatched by E-FMS1 directly to the part PA1-MON of PA1 (see further on in the description of the architecture). The generation of $CV1_{MON}$ is carried out by the monitoring part PA1-MON of the first automatic pilot PA1. Thus, the monitoring flight control $CV1_{MON}$ is generated by PA1-MON independently of the flight control $CV1_{COM}$ generated by PA1-COM on the basis of the same guidance order $CG1_{COM}$. The automatic pilot PA1 is used here in a different manner from the prior art, since in the implementation of the method 100 the part PA1-MON receives the guidance order $CG1_{COM}$ directly without passing through PA1-COM, on the basis of which it generates an inherent flight control $CV1_{MON}$.

A step 116 monitors the integrity of the first reference guidance order $CG1_{COM}$ with the aid of the first monitoring guidance order $CG1_{MON}$. This monitoring is rendered possible on account of the fact that the existence of a directive $CG1_{MON}$ generated by FMS1-MON by the method according to the invention.

This monitoring makes it possible to detect an error of PSE type.

Thus the method 100 according to the invention delivers as output a dependable guidance order $CG1_{COM}$.

Typically the reference trajectory $TRAJ1_{COM}$ calculated by FMS1-COM and transmitted by FMS1-COM to F1-MON which stores it decomposes into a lateral trajectory $TRAJ1_{L\text{-}COM}$ and a vertical trajectory $TRAJ1_{V\text{-}COM}$. Likewise, a guidance order decomposes into a lateral guidance order $CG_L$ and a vertical guidance order $CG_V$. The FMS1-COM calculates a guidance order according to the three axes, i.e. a lateral guidance order, a vertical guidance order and a speed directive.

According to a variant the monitoring of the guidance carried out by F1-MON is performed on the overall guidance order, that is to say that the MON part carries out a calculation of the lateral directive and of the vertical directive and of the speed directive, which will be compared with the lateral, vertical and speed directives calculated by the COM part.

According to another preferred variant, the monitoring of the guidance carried out by F1-MON is performed by comparison on the lateral guidance order according to the following steps:

calculation by F1-MON of a lateral guidance order on the basis of the first lateral reference trajectory $TRAJ1_{L\text{-}COM}$ stored by F1-MON and of the position $POS1_{COM}$ (use of the same guidance laws by FMS1-COM and F1-MON), comparison of the lateral guidance order calculated by F1-MON with the lateral guidance order calculated by FMS1-COM.

According to one embodiment, the monitoring of the vertical guidance is not performed by calculation by the F1-MON of a vertical guidance order (so as to be compared with the vertical directive arising from the FMS1-COM), but is performed according to the following steps:

on the basis of $TRAJ1_{V\text{-}COM}$ and of the position $POS1_{COM}$, calculation of the desired parameters altitude and/or speed and/or slope, comparison of the desired parameters with these same measured parameters (arising from a part of the data arising from onboard sensors) corresponding to what the aircraft actually does. For example, if the aircraft must be at 2500 ft while passing over a point of the flight plan, F1-MON verifies that the altitude of the aircraft is equal to 2500 ft+/−50 ft when passing the point.

Indeed, the vertical-piloting laws are very complex and their duplication on the one hand would increase the complexity of F1-MON and on the other hand would increase the difficulty of fine tuning of the comparators of the guidance orders. The variant hereinabove therefore sticks to the comparison of the aforementioned parameters, making it possible to verify that the aircraft is indeed following the desired vertical trajectory.

When the first reference guidance order $CG1_{COM}$ is not monitored as being dependable the method 100 invalidates at 103 the first FMS assembly E-FMS1 and the associated guidance, thereby making it possible to prevent the aeroplane from taking an erroneous trajectory as a consequence of an erroneous guidance order.

The monitoring of the integrity of $CG1_{COM}$ makes it possible to invalidate the first assembly E-FMS1 as soon as an anomaly is detected.

The method thus allows a monitoring of the position and of the guidance order making it possible to attain a high "hazardous" level of integrity in the calculation of $CG1_{COM}$. This increase in the integrity is obtained by a lone FMS with simple modifications of the FMS, the increase in the integrity being carried entirely by the MON part.

When the first reference guidance order $CG1_{COM}$ is monitored as being dependable, the method 100 according to the invention delivers as output a first reference guidance order $CG1_{COM}$ with an integrity level improved by the integrity monitoring steps 102 and 116. Thus the method 100 delivers a first dependable reference guidance flight control $CG1_{COM}$, a first reference flight control $CV1_{COM}$ and a first monitoring flight control $CV1_{MON}$ which are generated on the basis of the first dependable reference guidance flight control $CG1_{COM}$.

The improvement of the integrity is not obtained at the price of a significant increase in the calculation resources.

The method according to the invention is implemented in real time and permanently, thus steps 105, 106 and 116 are carried out quasi-simultaneously.

In a preferred mode, the step 116 of monitoring the integrity of the first reference guidance order $CG1_{COM}$ consists in comparing it with the first monitoring guidance order $CG1_{MON}$ with the aid of a guidance criterion. This comparison entails the same logic as that effected by an automatic pilot of COM/MON type. Echoing this COM/MON comparison of the PA, FMS-COM and F-MON can exchange their $CG1_{COM}$ and $CG1_{MON}$.

Preferentially the comparison is performed in the part FMS1-MON, the part FMS1-COM transmitting the directive $CG1_{COM}$ to it for this purpose. Thus in this preferred mode FMS1-COM transmits $CG1_{COM}$ to FMS1-MON (for comparison), and to PA1-COM and PA1 MON (for the guidance).

Figure 7:
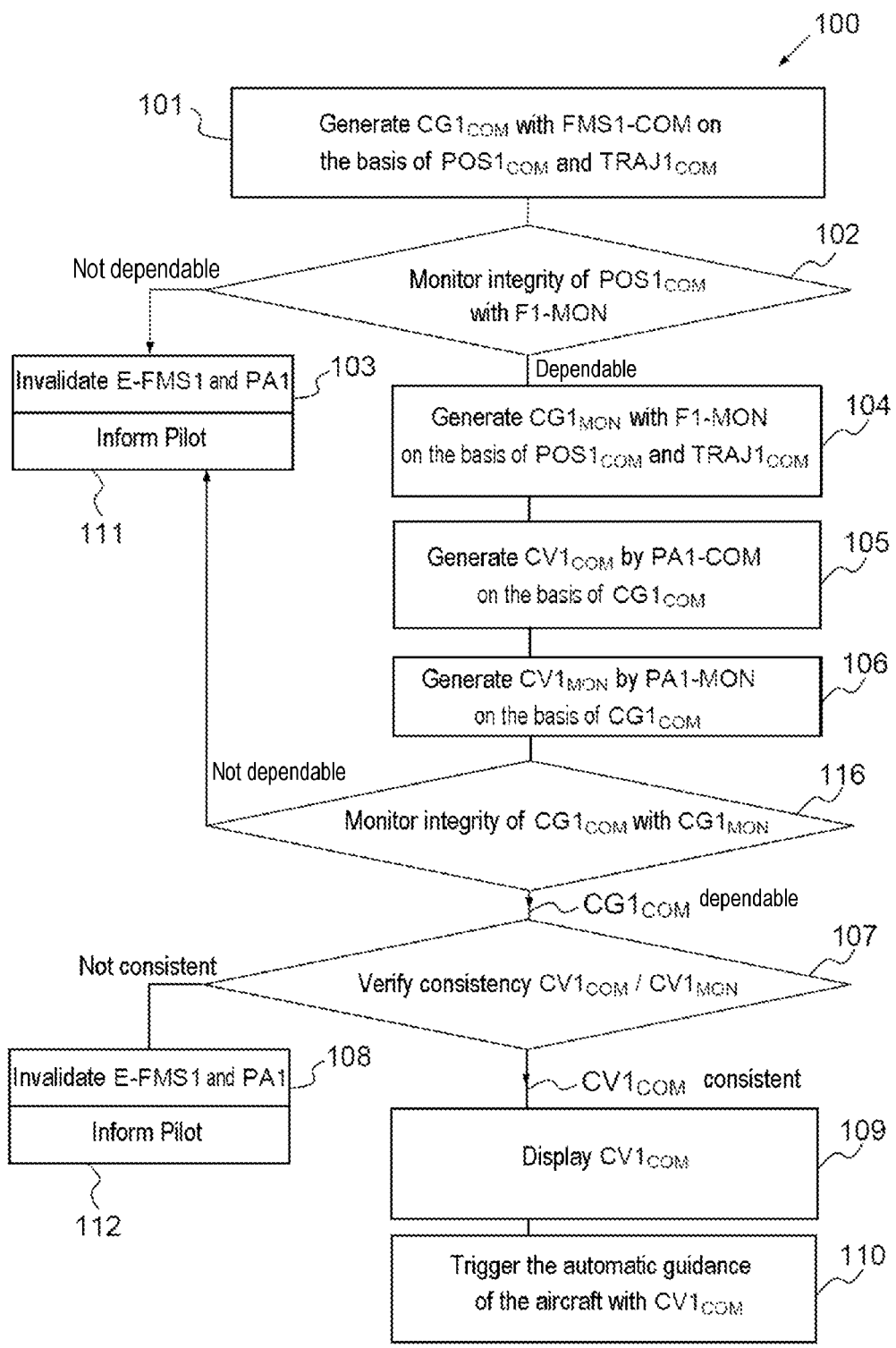

Preferentially, the method 100 furthermore comprises a step 107 consisting in verifying the consistency of the first reference flight $CV1_{COM}$ and monitoring $CV1_{MON}$ commands, as illustrated in FIG. 7.

Typically this verification is operated with the aid of the conventional comparator of the automatic pilot.

When the flight controls $CV1_{COM}$ $CV1_{MON}$ are inconsistent, the method 100 comprises a step 108 which invalidates the first automatic pilot PA1 (that is to say disengages or disconnects it).

From an operational point of view, the method 100 delivers a guidance order $CG1_{COM}$ (step 101) which is dispatched to the PA1 to generate a flight control $CV1_{COM}$ according to steps 105, 106, 107 and then 109 and 110. The monitoring with the aid of steps 104 and 116 is carried out in parallel. Thus, when a non-dependable directive $CG1_{COM}$ is dispatched to the PA1 which generates a $CV1_{COM}$, in a very short time span the E-FMS/PA chain is invalidated.

When the flight controls $CV1_{COM}$ and $CV1_{MON}$ are consistent, the method delivers as output a consistent flight control $CV1_{COM}$. Preferentially, the method furthermore comprises a step 109 of displaying the first consistent reference flight control $CV1_{COM}$. Preferentially, this display is carried out on the PFD (Primary Flight Display) in the form of flight director bars.

The pilot thus benefits from a flight control $CV1_{COM}$ whose integrity has been strengthened by the verification step 107, which uses the command $CV1_{MON}$ calculated independently as explained above.

The method 100 thus makes it possible to obtain a flight control of the aircraft exhibiting a high integrity compatible with the "hazardous" level required for the RNP xx procedures, for example RNP 0.3.

The pilot can thus if he so wishes pilot the aircraft with the stick and aided by the display of $CV1_{COM}$. In a preferred variant, the method 100 furthermore comprises a step 110 (also illustrated in FIG. 7) consisting in triggering the automatic guidance of the aircraft with the first reference flight control $CV1_{COM}$ (when the first reference flight $CV1_{COM}$ and monitoring $CV1_{MON}$ commands are consistent). According to one option the triggering is automatic, according to another option the triggering is performed by a pilot action, such as pressing a button.

The aircraft thus has a high-integrity flight control allowing automatic guidance of the aircraft compatible with an RNP AR procedure with RNP<0.3 NM.

Preferentially, the method 100 according to the invention furthermore comprises a step 111 consisting in informing the pilot of the invalidation of the first FMS assembly E-FMS1 and of the automatic pilot, when the first reference position or the first reference guidance order $CG1_{COM}$ is not monitored as being dependable, and a step 112 consisting in informing the pilot of the invalidation of the first automatic pilot PA1, when the first reference flight $CV1_{COM}$ and monitoring $CV1_{MON}$ commands are inconsistent.

Preferentially, the informing is operated by displaying on a display, typically the control panel FCU (FCU for Flight Control Unit). Preferentially the displaying of steps 111 and 112 is common.

The pilot can also be informed by an audio signal, a telltale light.

Figure 8A:
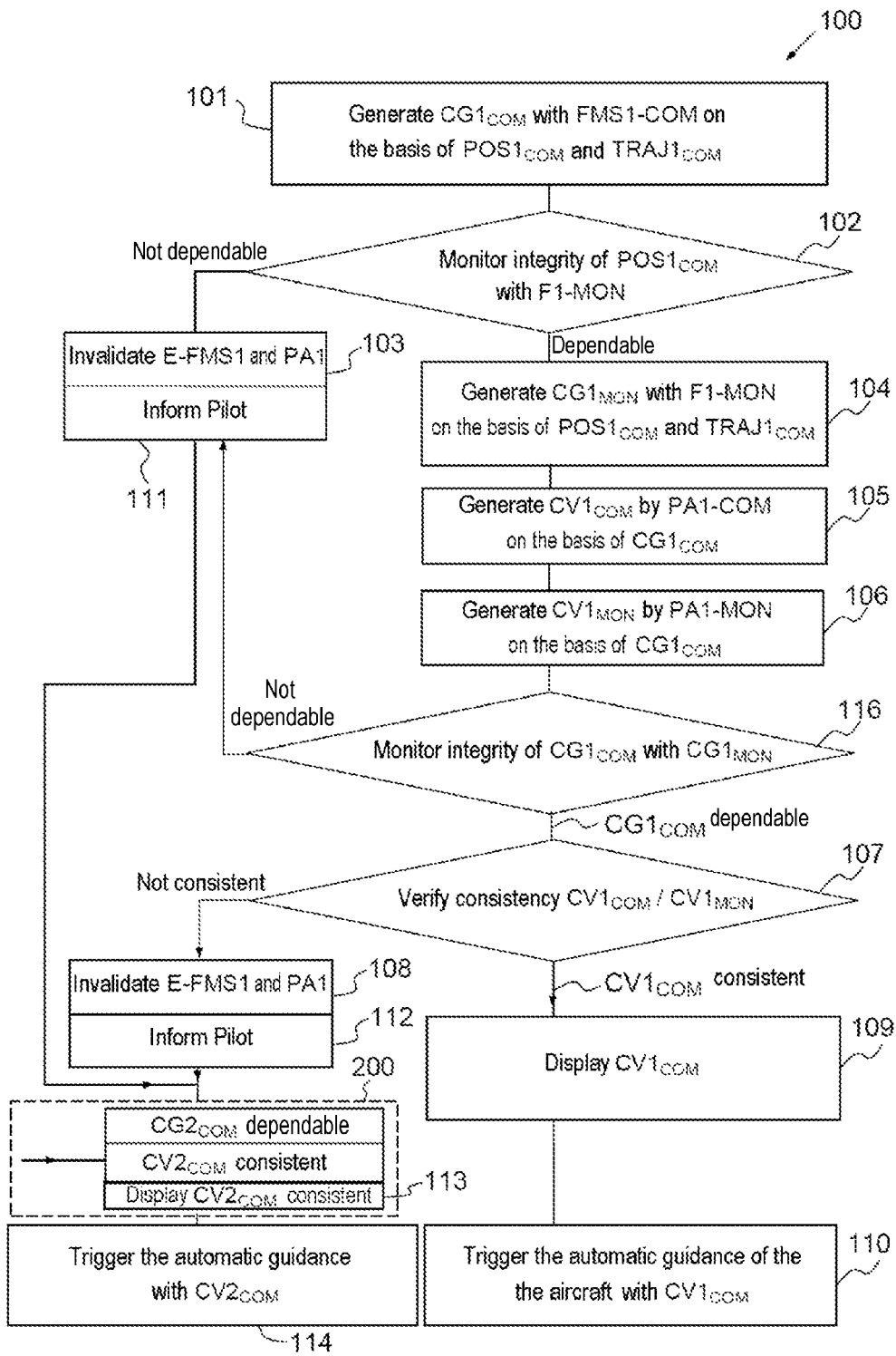
Figure 8B:
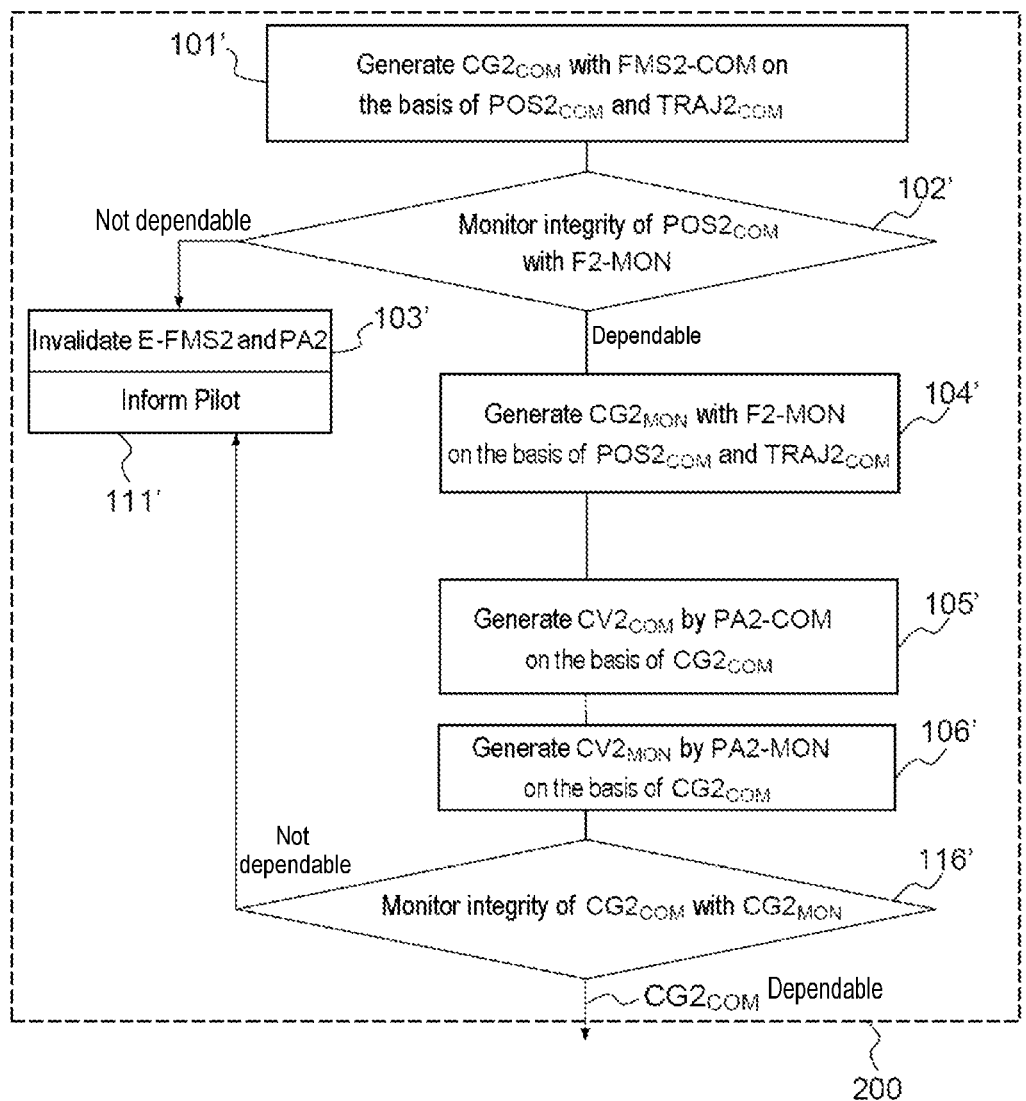
Figure 8C:
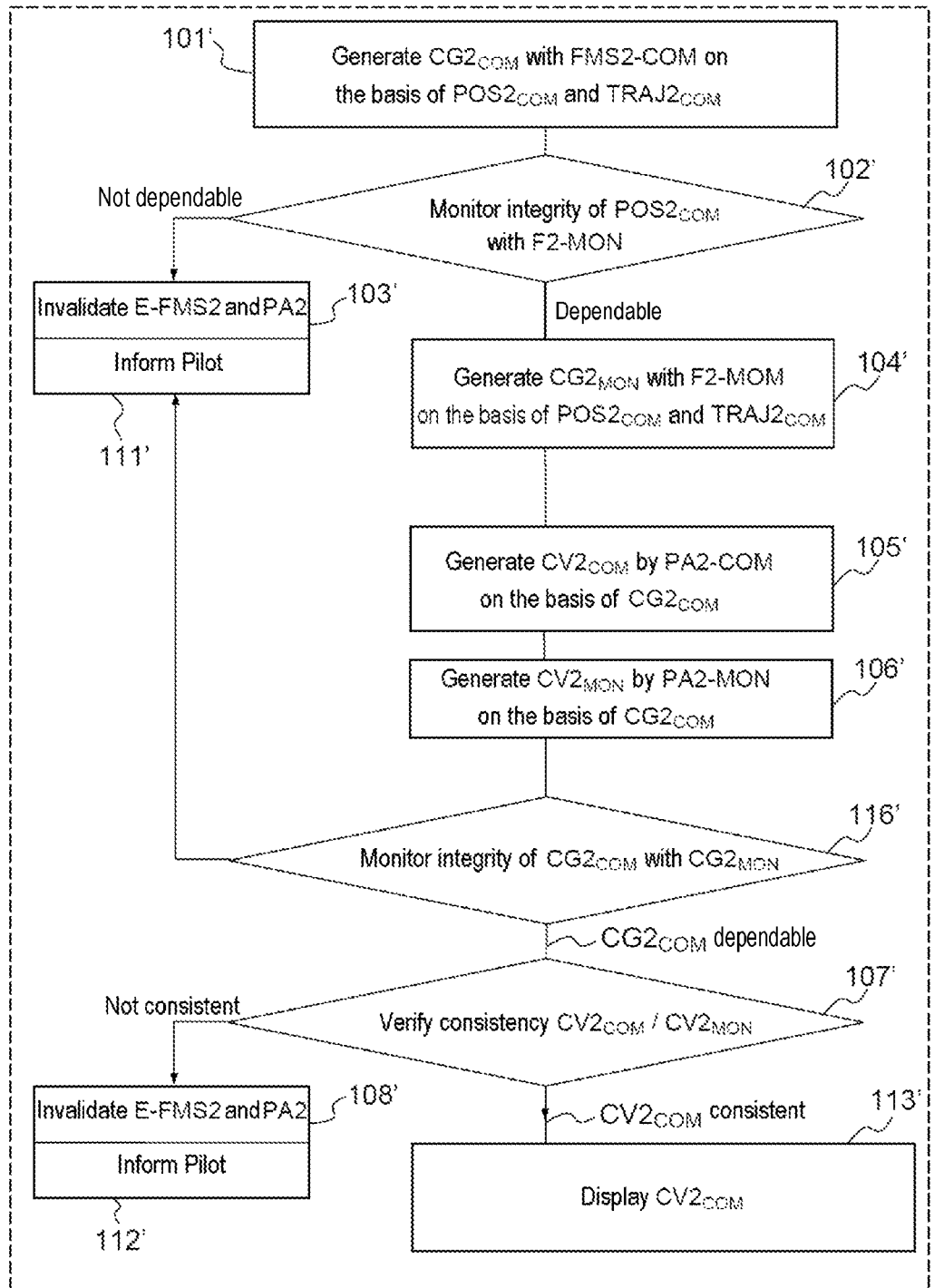

The availability is obtained by a duplication of the method 100 according to a preferred variant such as illustrated in FIGS. 8a, 8b and 8c.

The method 100 according to this preferred variant delivers a second dependable reference guidance command $CG2_{COM}$, a second reference flight control $CV2_{COM}$ and a second monitoring flight control $CV2_{MON}$, which are obtained simultaneously in a continuous manner according to the steps of a method 200 corresponding to the steps of the method 100 of FIG. 6 and duplicated, with the aid of a second FMS assembly E-FMS2 and of a second automatic pilot PA2.

FIG. 8b describes the method 200 making it possible to generate the second dependable reference guidance command $CG2_{COM}$.

The method 200 comprises:

a step 101' consisting in generating a second reference guidance order $CG2_{COM}$, calculated by a part of a second FMS assembly E-FMS2 called the calculation part of the second assembly FMS FMS2-COM, on the basis of a second reference position $POS2_{COM}$ and of a second reference trajectory $TRAJ2_{COM}$ which are calculated by the calculation part FMS2-COM of the second FMS assembly on the basis of data arising from onboard sensors DATA, from a second navigation database NAV2 DB and from a second performance database PERF2 DB, a step 102' consisting in monitoring the integrity, by a part of the second FMS assembly E-FMS2 called the monitoring part of the second FMS assembly F2-MON, of the second reference position $POS2_{COM}$ on the basis of at least part of the said data arising from onboard sensors.

When the second reference position is not monitored as being dependable the method 200 comprises a step 103' consisting in invalidating the second FMS assembly E-FMS2 and the associated guidance system and preferentially a step 111' consisting in informing the pilot of the invalidation.

When the second reference position is monitored as being dependable, the method 200 comprises:

a step 104' consisting in generating a second monitoring guidance order $CG2_{MON}$, calculated by the monitoring part of the second FMS assembly F2-MON, on the basis of the second reference position $POS2_{COM}$ and of the first reference trajectory $TRAJ2_{COM}$, a step 105' consisting in generating a second reference flight control $CV2_{COM}$, by a reference part PA2-COM of a second automatic pilot PA2, on the basis of the second reference guidance order $CG2_{COM}$, a step 106' consisting in generating a second monitoring flight control $CV2_{MON}$, by a monitoring part PA2-MON of the second automatic pilot PA2, on the basis of the first reference guidance order $CG2_{COM}$, a step 116' monitors the integrity of the second reference guidance order $CG2_{COM}$ with the aid of the second monitoring guidance order $CG2_{MON}$. When the second reference guidance order $CG2_{COM}$ is not monitored as being dependable the method 200 invalidates at 103' the second FMS assembly E-FMS2 and the associated guidance.

When the second reference guidance order $CG2_{COM}$ is monitored as being dependable, the method 200 delivers as output the first dependable reference guidance order $CG2_{COM}$.

Preferentially, the method 100 according to this preferred variant integrates the method 200 furthermore comprising, as illustrated in FIG. 8c:

a step 107' consisting in verifying the consistency of the second reference flight $CV2_{COM}$ and monitoring $CV2_{MON}$ commands.

When the second reference flight $CV2_{COM}$ and monitoring $CV2_{MON}$ commands are inconsistent, the method 200 furthermore comprises a step 108' consisting in invalidating the second automatic pilot PA2 and preferentially a step 112' consisting in informing the pilot of the invalidation.

When the second reference flight $CV2_{COM}$ and monitoring $CV2_{MON}$ commands are consistent, the method 200 delivers as output $CV2_{COM}$ consistent.

From an operational point of view, the method 200 delivers a guidance order $CG2_{COM}$ (step 101') which is dispatched to the PA2 to generate a flight control $CV2_{COM}$ according to steps 105', 106', 107' and then 113'. The monitoring with the aid of steps 104' and 116' is carried out in parallel. Thus, when a non-dependable directive $CG2_{COM}$ is dispatched to the PA2 which generates a $CV2_{COM}$, in a very short time span the E-FMS2/PA2 chain is invalidated.

Thus according to this preferred variant, the method 100 simultaneously delivers a first flight control $CV1_{COM}$ and a second flight control $CV2_{COM}$. Indeed, to ensure continuity, it is appropriate that the process 200 be implemented in parallel, simultaneously and in a continuous manner, with the method of FIG. 6 or 7, so as to be able to have a dependable guidance command $CG2_{COM}$ and preferentially a consistent flight control $CV2_{COM}$ with high integrity level in case of invalidation of the first assembly E-FMS1 or of the first automatic pilot PA1.

FIG. 8a describes the method 100 according to the preferred variant of the invention consisting in delivering the second consistent reference flight control $CV2_{COM}$, generated and verified simultaneously in a continuous manner according to the same duplicated steps (method 200) of the method according to the invention, when the first flight management system or the first automatic pilot is invalid.

Preferentially, as illustrated in FIG. 8a, the method 100 furthermore comprises a step 113 consisting in displaying the second reference flight control $CV2_{COM}$, when the first flight management system or the first automatic pilot is invalid.

Preferentially, as illustrated in FIG. 8a, the method 100 furthermore comprises a step 114 consisting in triggering the automatic guidance of the aircraft with the second reference flight control $CV2_{COM}$.

According to one option, the triggering step 114 is operated manually by the pilot. According to another option, the triggering step 114 is operated automatically without intervention of the pilot.

Thus the method 100 according to the preferred variant, implementing in parallel a method 200 on a second FMS assembly coupled to a second automatic pilot, makes it possible on the one hand to guide the aircraft with an initial flight management and guidance system (E-FMS1 and PA1) with a high integrity level and on the other hand, in case of detection of a fault with this initial system, to perform a switchover to another flight management and guidance system (E-FMS2 and PA2) and to guide the aircraft with this other system with the same integrity level as that of the initial system.

Advantageously the step 102 of monitoring the integrity of the first reference position $POS1_{COM}$ comprises a sub-step consisting in comparing the reference position $POS1_{COM}$ with an estimated position $POS1_{est}$ calculated by the monitoring part of the first FMS FMS1-MON, on the basis of at least part of the data DATA arising from onboard sensors, typically GPS data, with the aid of a position criterion.

The position criterion is for example that the calculated position $POS1_{COM}$ is situated at a distance of less than a certain threshold (depending on the desired precision in an RNPxx approach) of the estimated position $POS1_{est}$. For example less than 0.2 NM for an RNP 0.3 approach.

From an operational point of view, one option is that the aircraft cruises using the two FMS assemblies E-FMS1 and E-FMS2 in a conventional manner, that is to say with a simplified method implementing steps 100, 105, 106, 107 (108,112) 109 and 110, i.e. guidance with $CG1_{COM}$ and $CV1_{COM}$ without implementing the monitorings operated by the parts F1-MON and F2-MON.

Next, when the aircraft is in the approach phase according to a constrained-corridor procedure requiring an RNP AR procedure, the complete method 100 is activated, implementing steps 102, 103 (111), 104, 116, and the switchover onto the second system and steps 113 and 114 in case of invalidation or of inconsistency of the first assembly E-FMS1.

Thus the complete method 100 is implemented solely during the RNP approach phase requiring an integrity level of "hazardous" type.

The RNP procedure is geo referenced, this signifying that the flight plan and the trajectory have the same definition, and preferentially it is sought to validate that the extraction of the procedure from the database is correct. Thus, advantageously the method according to the invention, when the aircraft is in the RNP approach phase, comprises a preliminary step of validating the flight plan consisting in:
  selecting the RNP AR procedure (pilot action),
  inserting the procedure into the flight plan. This insertion is performed by FMS1-COM and FMS2-COM,
  comparing the inserted flight plans.

If the result of the comparison is incorrect, the pilot is alerted, up to him to relaunch a new insertion, to deactivate the FMS identified as erroneous and to relinquish flying the procedure.

If the result of the comparison is correct, each FMS-COM calculates the trajectory and provides this trajectory to its F-MON which stores it etc.

For optimal automatic guidance and fast switchover in case of a problem in the first chain, the first and second automatic pilots PA1 and PA2 are engaged simultaneously prior to the commencement of the method 100.

The method is intended to be executed by the overall flight management system of the aircraft, that is to say the flight management system comprising the first and second assembly E-FMS1 and E-FMS2, the two automatic pilots PA1 and PA2, and a facility making it possible to operate if appropriate a triggering of the simplified method, and a triggering of the complete method according to the invention in parallel on the two assemblies and associated guidance during an RNP procedure, as well as the switchover from one to the other in case of invalidation of the first.

Figure 9:
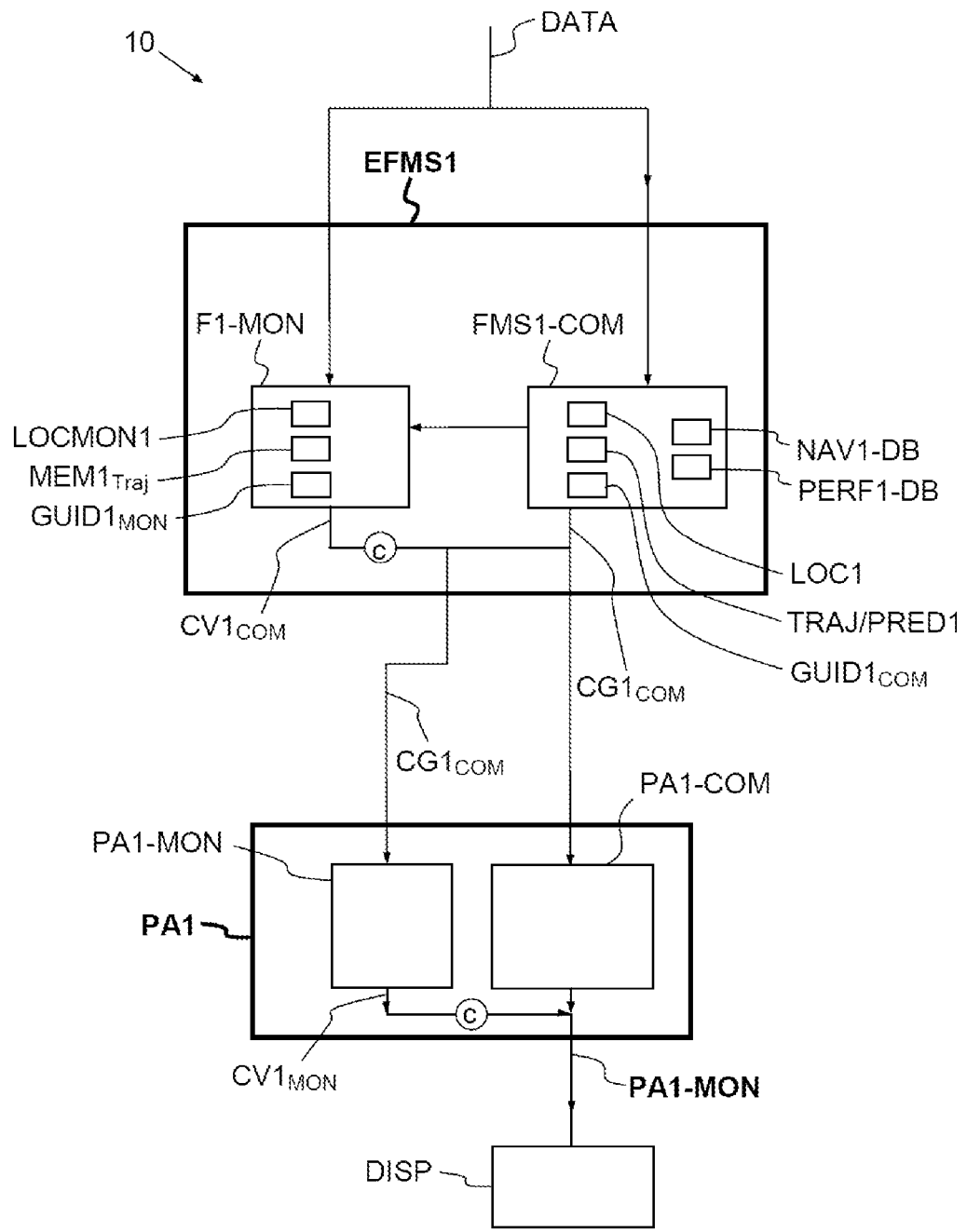

According to another aspect, the invention relates to a system 10 for flight management and guidance of an aircraft with high integrity illustrated in FIG. 9 and comprising a first FMS assembly E-FMS1 and a first automatic pilot PA1 coupled to E-FMS1.

The first FMS assembly E-FMS1 comprises a calculation part FMS1-COM and a monitoring part F1-MON.

The part FMS1-COM comprises:
  a first navigation database NAV1 DB and a first performance database PERF1 DB,
  a first position calculation module LOCI configured to calculate a first reference position $POS1_{COM}$ on the basis of data arising from onboard sensors and the databases,
  a first trajectory calculation module TRAJ/PRED1 configured to calculate a first reference trajectory $TRAJ1_{COM}$ on the basis of data arising from onboard sensors and the databases,
  a first reference guidance module $GUID1_{COM}$ configured to generate a first reference guidance order $CG1_{COM}$, on the basis of the first reference position $POS1_{COM}$ and of the first reference trajectory $TRAJ1_{COM}$.

The part FMS1-COM corresponds to a conventional architecture of FMS as described in the prior art.

The monitoring part F1-MON is configured to monitor the integrity of the first reference position $POS1_{COM}$ on the basis of at least part of the data arising from onboard sensors (functionality illustrated by the module LOCMON1). The module LOCMON1 is not a module of the same type as LOC1 and TRAJ/PRED1 and its role is not to recalculate $POS1_{COM}$ entirely but to verify it, that is to say to detect a calculation error. It therefore requires much less calculation power.

For example the position $POS1_{COM}$ is transmitted to LOCMON1 by FMS1-COM and this position is compared with data DATA, typically GPS and/or inertial, arising from onboard sensors, directly received by F1-MON. If the position $POS1_{COM}$ differs from the position estimated on the basis of these sensors, the position $POS1_{COM}$ is considered non-dependable.

The monitoring part F1-MON is also configured to store the reference trajectory $TRAJ1_{COM}$ transmitted by FMS1-COM (functionality illustrated by the storage module $MEM_{Traj}$) and to generate a first monitoring guidance order $CG1_{MON}$ (functionality illustrated by the first monitoring guidance module $GUID1_{MON}$), calculated on the basis of the first reference position $POS1_{COM}$ monitored and of the first reference trajectory $TRAJ1_{COM}$ stored. The first monitoring guidance order $CG1_{MON}$ is generated by F1-MON independently of $CG1_{COM}$, by using piloting laws identical to those used by FMS1-COM to calculate $CG1_{COM}$.

The monitoring part F1-MON is also configured (module $GUID1_{MON}$) to monitor the integrity of the first reference guidance order $CG1_{COM}$. Accordingly the first reference guidance order $CG1_{COM}$ is transmitted by FMS1-COM to F1-MON.

Verification of integrity typically consists in comparing the first reference guidance order $CG1_{COM}$ calculated by the first reference guidance module $GUID1_{COM}$ with the first monitoring guidance order $CG1_{MON}$ calculated by the first monitoring guidance module $GUID1_{MON}$, with the aid of a guidance criterion. If too significant a disparity exists between the two directives, the directive $CG1_{COM}$ is declared non-dependable. Operationally, during an RNP xx approach, the current directive $CG1_{COM}$ which will cause the aircraft to exit the corridor is invalidated and the coupled automatic pilot PA1 is disengaged.

According to a preferred variant, only a lateral guidance order is calculated by the module $GUID1_{MON}$, the monitoring of the vertical guidance taking place through a comparison of parameters, such as is described above.

Thus the part F1-MON (module $GUID1_{MON}$) makes it possible to detect a calculation error at the level of $CG1_{COM}$, and constitutes a means for verifying the integrity of $CG1_{COM}$, which makes it possible to be compatible with the "hazardous" level.

Moreover, the integrity has been increased independently of the "base" initial flight management system FMS1-COM by the addition of an external surveillance chain F1-MON. The part F1-MON does not comprise any complex functions and does not demand any significant calculation resources, resources that it must be able to share with another application and on an existing facility.

An additional advantage is to use the guidance order formulation capability of the F-MON. Indeed on loss of the 2 FMSs because of a circuit fault for example, by connecting the F-MON to the Automatic pilot, it is possible, in this degraded configuration, to maintain the guidance of the aeroplane on the basis of the trajectory stored by the F-MON.

The directive $CG1_{COM}$ generated by FMS1-COM and monitored by F1-MON is thereafter dispatched into the first automatic pilot PA1.

PA1 comprises a reference part PA1-COM and a monitoring part PA1-MON, according to a conventional architecture. But the system 10 according to the invention is configured to dispatch $CG1_{COM}$ to PA1-COM and to PA1-MON in parallel independently.

PA1-COM is configured to generate a first reference flight control $CV1_{COM}$ on the basis of the first reference guidance order $CG1_{COM}$, for example in a conventional manner.

PA1-MON is configured to generate a first monitoring flight control $CV1_{MON}$, on the basis of the first reference guidance order $CG1_{COM}$.

The commands $CV1_{COM}$ and $CV1_{MON}$ are thus generated in an independent manner by the two parts of the automatic pilot.

PA1 is furthermore configured to verify the consistency of the first reference flight $CV1_{COM}$ and monitoring $CV1_{MON}$ commands, typically with its comparator. Thus the flight control $CV1_{COM}$ is on the one hand generated on the basis of a high-integrity directive, and on the other hand verified independently by PA1-MON. Thus in order to pilot the aircraft the system 10 has a flight control $CV1_{COM}$ with greatly improved integrity level, amply compatible with a "hazardous" level. This integrity level has been obtained without substantially modifying the automatic pilot of conventional COM/MON architecture.

The flight management and guidance system 10 is furthermore configured to invalidate the first FMS assembly E-FMS1 when the first reference position or the first reference trajectory or the first guidance order is not monitored as being dependable, and to invalidate the first automatic pilot PA1 when the first reference flight $CV1_{COM}$ and monitoring $CV1_{MON}$ commands are inconsistent.

Preferentially the flight management and guidance system 10 furthermore comprises at least one display module DISP configured to display the first reference flight controls $CV1_{COM}$ when the first FMS assembly and the first automatic pilot are valid.

Advantageously the flight management and guidance system 10 according to the invention is configured to trigger the automatic guidance of the aircraft with the first reference flight control $CV1_{COM}$, when the first flight management system and the first automatic pilot are valid. The triggering can take place automatically or on action of the pilot.

Figure 10:
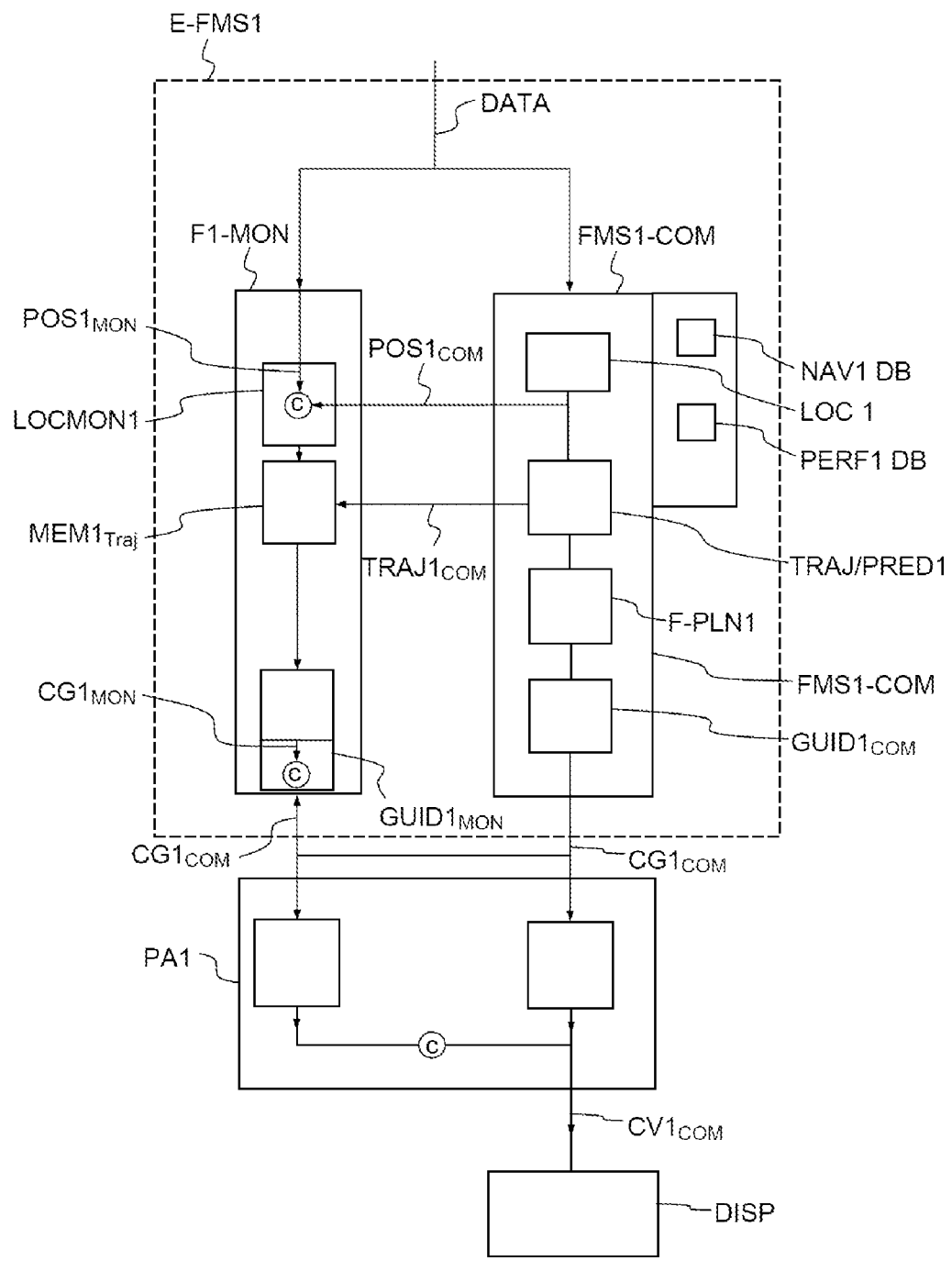

FIG. 10 describes a more detailed implementation of the system according to the invention highlighting the 2 levels of verification of FMS1-COM operated by F1-MON.

Figure 11:
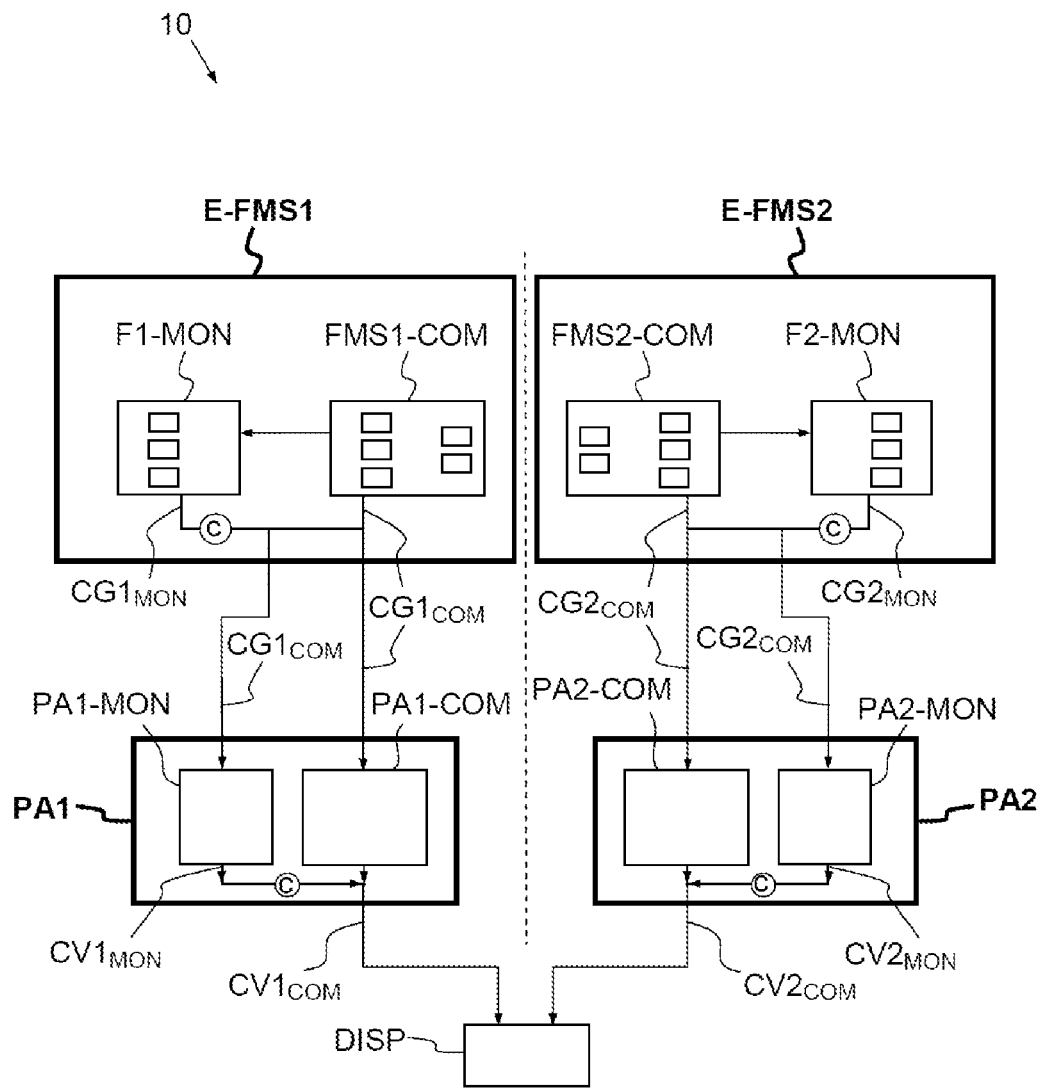
FIG. 11 illustrates a variant of the system 10 for flight management and guidance of an aircraft with high integrity according to the invention comprising a second FMS assembly and a second automatic pilot, FIG. 12 describes an exemplary detailed implementation of the system of FIG. 11.

According to a variant illustrated in FIG. 11, the system 10 for flight management and guidance of an aircraft with high integrity according to the invention furthermore comprises a second FMS assembly E-FMS2 and a second automatic pilot PA2 corresponding respectively to a duplication of the first FMS assembly E-FMS1 and of the first automatic pilot PA1.

The system 10 is configured to generate a first reference flight control $CV1_{COM}$ and a second reference flight control $CV2_{COM}$ simultaneously and in a continuous manner. The flight control $CV1_{COM}$ arises from the chain consisting of E-FMS1 coupled to the PA1, and the flight control $CV2_{COM}$ arises from the chain consisting of E-FMS2 coupled to the PA2.

Preferentially, the system is configured to trigger the automatic guidance with the first reference flight control $CV1_{COM}$ when the first flight management system and the first automatic pilot are valid, and to trigger the automatic guidance of the aircraft with the second reference flight control $CV2_{COM}$ when the first flight management system and the first automatic pilot are invalid.

In this manner, the continuity of the guidance is ensured in case of fault with the first chain E-FMS1/PA1.

Thus the dual requirement of high integrity and of continuity is fulfilled with only two complete FMSs, FMS1-COM and FMS2-COM, verified by respectively the external chain F1-MON and F2-MON. This architecture is called DUAL COM/MON, since it consists of two independent chains, each being verified by a MON part.

This solution is less expensive than the Triplex solution since it avoids a third FMS, an additional calculator which on the other hand increases the weight of the aircraft and its electrical consumption. Moreover this architecture gives rise to only a low level of modification of the automatic pilot.

Advantageously, the display module DISP is furthermore configured to display the second reference flight control $CV2_{COM}$ when the first flight management system and the first automatic pilot are invalid.

From an operational point of view, the system 10 according to the variant of FIG. 11 complies with the requirements of RNP AR approaches for aeroplanes having only two FMSs. The "hazardous" integrity constraint and availability constraint are complied with automatically.

During the RNP approach, the two chains operate in parallel, the second being at any instant ready to take over in case of fault detected on the first.

Figure 12:
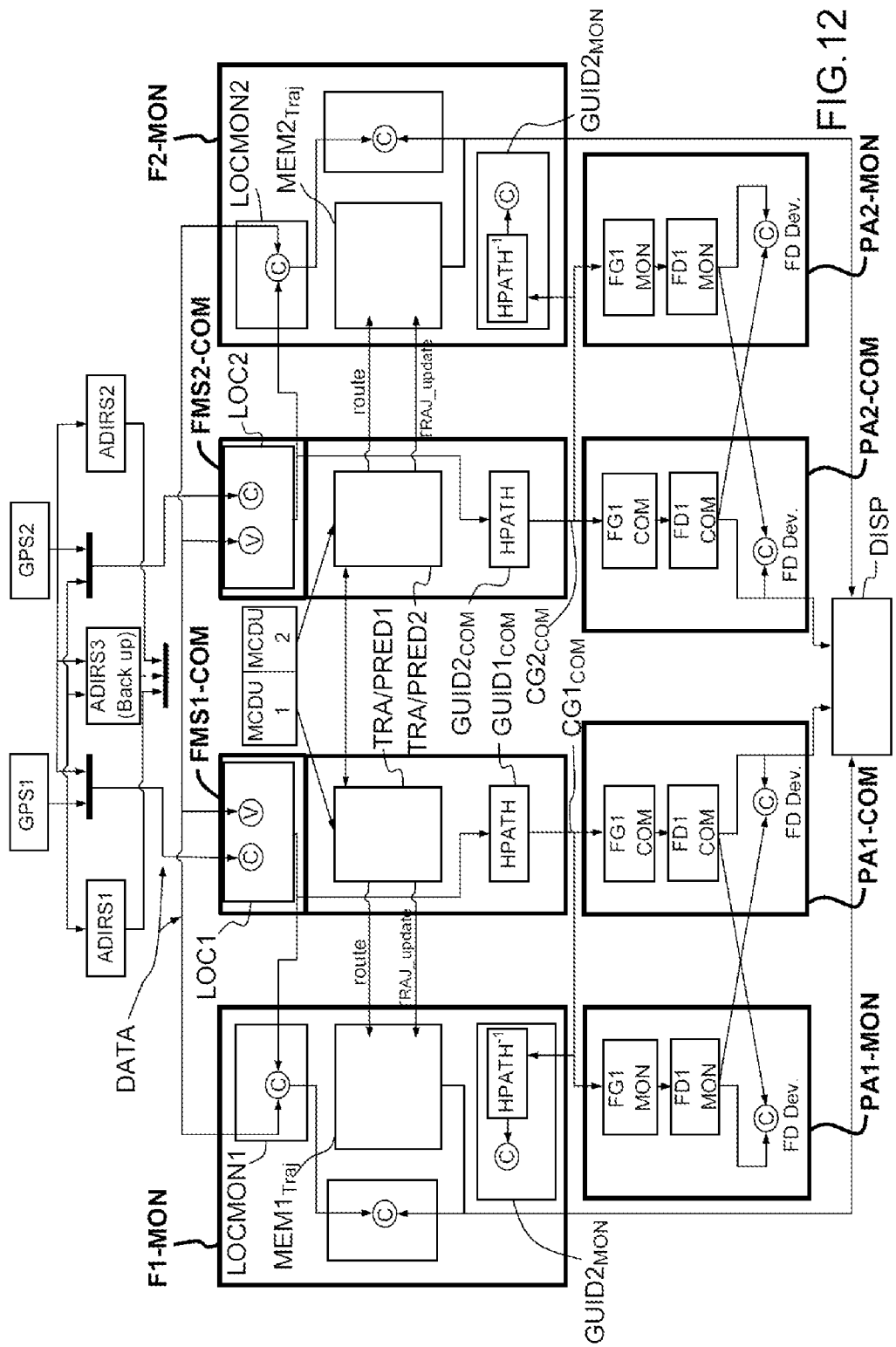

FIG. 12 describes an exemplary detailed implementation of the system 10 of FIG. 11. Only the modules useful to the understanding of the invention are represented.

The DATA are the redundant GPS1, GPS2 data, ADIRS signifies Air Data Inertial Reference System, HPATH signifies Horizontal Path, FG signifies "Flight Guidance" and FD "Flight Director".

Figure 13:
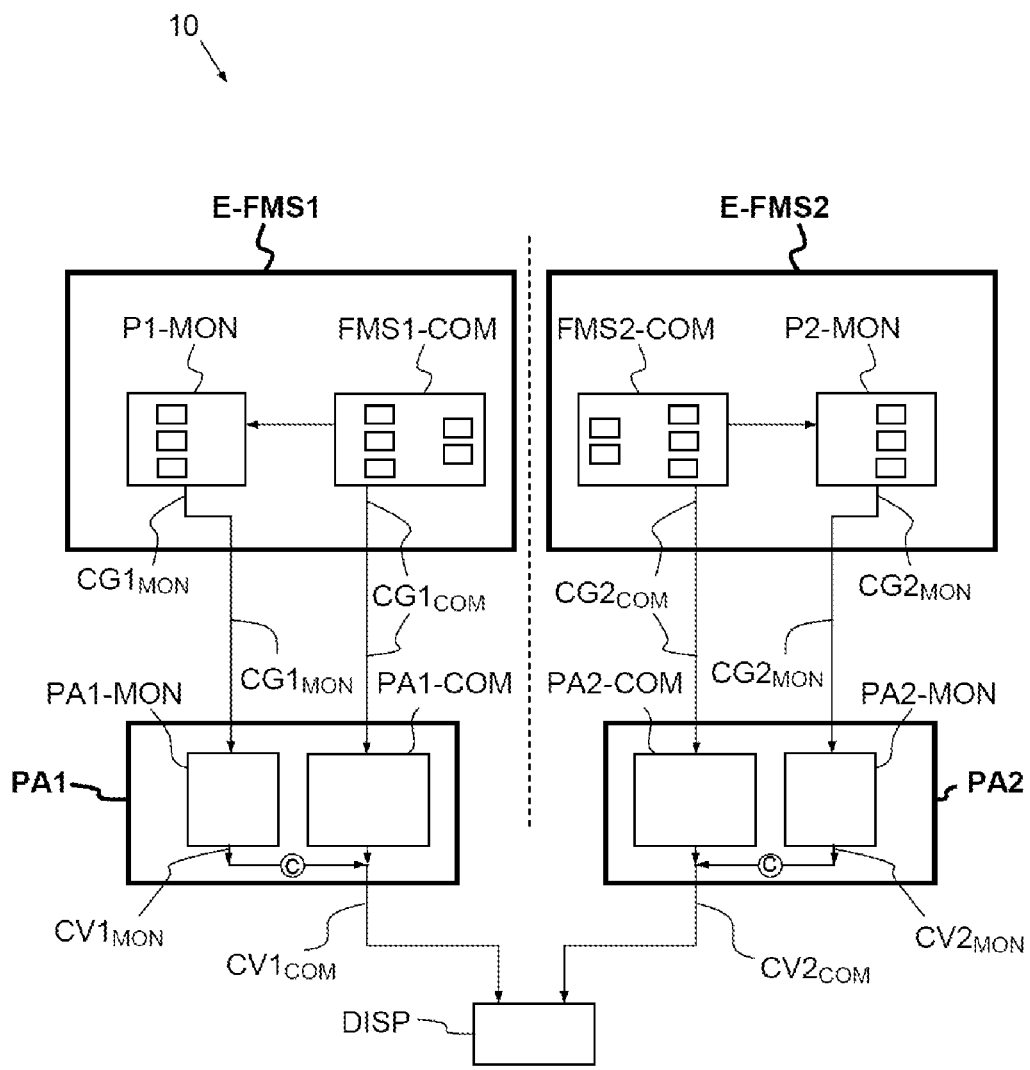
FIG. 13 illustrates another variant of the system according to the invention.

According to another variant described in FIG. 13, the directive $CG_{COM}$ (1 or 2) is dispatched solely to the part PA-COM (1 or 2), and it is the directive $CG_{MON}$ (1 or 2) which is dispatched to the part PA-MON (1 or 2) of the automatic pilot.

According to another aspect the invention relates to a computer program product comprising code instructions making it possible to perform the steps of the method according to the invention.

The method can be implemented on the basis of hardware and/or software elements. The method may be available in the guise of a computer program product on a computer readable medium.

The method may be implemented on a system that can use one or more dedicated electronic circuits or a general-purpose circuit.

The technique of the method according to the invention can be carried out on a reprogrammable calculation machine (a processor or a micro-controller for example) executing a program comprising a sequence of instructions, or on a dedicated calculation machine (for example an assembly of logic gates such as an FPGA or an ASIC, or any other hardware module).

The various modules of the system according to the invention can be implemented on one and the same processor or on one and the same circuit, or distributed over several processors or several circuits. The modules of the system according to the invention consist of calculation means including a processor.

The reference to a computer program which, when it is executed, performs any one of the previously described functions, is not limited to an application program executing on a single host computer. On the contrary, the terms computer program and software are used here in a general sense to refer to any type of computing code (for example, application software, micro software, microcode, or any other form of computer instruction) which can be used to program one or more processors to implement aspects of the techniques described here.

The invention claimed is:

1. A method of error detection of a flight management system coupled with a guidance of an aircraft according to a flight plan, comprising the steps of:
generating a first reference guidance order, calculated by a part of a first FMS assembly called the calculation part of the first FMS assembly, on the basis of a first reference position and of a first reference trajectory which are calculated by the calculation part of the first FMS assembly on the basis of data arising from onboard sensors, from a first navigation database and from a first performance database,
monitoring the integrity, by a part of the first FMS assembly called the monitoring part of the first FMS assembly, of the first reference position, on the basis of at least part of the said data arising from onboard sensors,
when the first reference position is not monitored as being dependable:
Invalidating the first FMS assembly and the associated guidance system,
when the first reference position is monitored as being dependable:
generating a first monitoring guidance order, calculated by the monitoring part of the first FMS assembly, on the basis of the first reference position and of the first reference trajectory,
generating a first reference flight control, by a reference part of a first automatic pilot, on the basis of the first reference guidance order,
generating a first monitoring flight control, by a monitoring part of the first automatic pilot, on the basis of the first monitoring guidance order,
monitoring the integrity of the first reference guidance order with the aid of the first monitoring guidance order,
when the first reference guidance order is not monitored as being dependable:
invalidating the first FMS assembly and the associated guidance,
when the first reference guidance order is monitored as being dependable:
delivering the first dependable reference guidance order.

2. The method according to claim 1, further comprising the step of, when the first reference guidance order is monitored as being dependable:
verifying the consistency of the first reference flight and monitoring commands,
when the first reference flight and monitoring commands are inconsistent:
invalidating the first automatic pilot,
when the first reference flight and monitoring commands are consistent:
delivering the first consistent reference flight control.

3. The method according to claim 2, further comprising the step of, when the first reference flight and monitoring commands are consistent:
displaying the first reference flight control.

4. The method according to claim 3, further comprising a step of triggering the automatic guidance of the aircraft with the first reference flight control, when the first reference flight and monitoring commands are consistent.

5. The method according to claim 1, further comprising a step of, when the first reference position or the first reference guidance order is not monitored as being dependable, or when the first reference flight and monitoring commands are inconsistent, informing a pilot of the invalidation of the first flight management system and of the first automatic pilot.

6. The method according to claim 1, wherein the monitoring of the integrity of the first reference guidance order consists of comparing it with the first monitoring guidance order with the aid of a guidance criterion.

7. The method according to claim 1, wherein the step of monitoring the integrity of the first reference position comprises the step of:
comparing the reference position with an estimated position calculated by the monitoring part of the first FMS on the basis of at least part of the said data arising from onboard sensors with the aid of a position criterion.

8. The method according to claim 2, further comprising delivering a second consistent reference flight control obtained simultaneously in a continuous manner according to the same duplicated steps of the method according to claim 2 with the aid of a second automatic pilot.

9. The method according to claim 8, further comprising a step of displaying the second reference flight control, when the first flight management system or the first automatic pilot is invalid.

10. The method according to claim 8, further comprising a step of triggering the automatic guidance of the aircraft with the second reference flight control, when the first flight management system or the first automatic pilot is invalid.

11. The method according to claim 10, wherein the triggering step is operated manually by the pilot.

12. The method according to claim 10, wherein the triggering step is operated automatically without intervention of the pilot.

13. The method according to claim 8, in wherein the aircraft is in the approach phase according to a constrained-corridor procedure.

14. The method according to claim 13, comprising a preliminary step of validating the flight plan.

15. The method according to claim 8, wherein the first and second automatic pilots are engaged simultaneously prior to the commencement of the method.

16. A system for flight management and guidance of an aircraft with high integrity comprising:
a first FMS assembly comprising:
a part called the calculation part of the first FMS assembly comprising:
a first navigation database and a first performance database,
a first position calculation module configured to calculate a first reference position on the basis of data arising from onboard sensors and the databases,
a first trajectory calculation module configured to calculate a first reference trajectory on the basis of data arising from onboard sensors and the databases,
a first reference guidance module configured to generate a first reference guidance order, on the basis of the first reference position and of the first reference trajectory
a part called the monitoring part of the first FMS assembly configured to
monitor the integrity of the first reference position on the basis of at least part of the data arising from onboard sensors,
store the first reference trajectory transmitted by the calculation part of the first FMS assembly,
generate a first monitoring guidance order calculated on the basis of the first reference position and of the first stored reference trajectory,
monitor the integrity of the first reference guidance order with the first monitoring guidance order
the said flight management and guidance system further comprising
a first automatic pilot comprising:
a reference part configured to generate a first reference flight control on the basis of the first reference guidance order,
a monitoring part configured to generate a first monitoring flight control, on the basis of the first reference guidance order,
the said first automatic pilot being further configured to verify the consistency of the first reference flight and monitoring commands,
the flight management and guidance system being further configured to invalidate the first FMS assembly and the first associated automatic pilot, when the first reference position is not monitored as being dependable or when the reference flight and monitoring commands are inconsistent.

17. The system for flight management and guidance according to claim 16, further comprising at least one display module configured to display the first reference flight controls when the first FMS assembly and the first automatic pilot are valid.

18. The system for flight management and guidance according to claim 16, configured to trigger the automatic guidance of the aircraft with the first reference flight control, when the first flight management system and the first automatic pilot are valid.

19. The system for flight management and guidance of an aircraft with high integrity according to claim 16, further comprising a second FMS assembly and a second automatic pilot corresponding respectively to a duplication of the first FMS assembly and of the first automatic pilot, the system being configured to generate a first reference flight control and a second reference flight control simultaneously and in a continuous manner.

20. The system according to claim 19, configured further to trigger the automatic guidance with the first reference flight control when the first flight management system and the first automatic pilot are valid, and to trigger the automatic guidance of the aircraft with the second reference flight control when the first flight management system and the first automatic pilot are invalid.

21. The system according to claim 20, in which the display module is further configured to display the second reference flight control when the first flight management system and the first automatic pilot are invalid.

22. A computer program product, the computer program comprising code instructions to perform the steps of the method according to claim 1.

\* \* \* \* \*